United States Patent Office 3,408,055
Patented Oct. 29, 1968

3,408,055
FLUID DISTRIBUTOR
André J. G. M. G. Machiels, Geleen, Netherlands, assignor to Stamicarbon N.V., Heerlen, Netherlands
Filed Apr. 18, 1966, Ser. No. 543,149
Claims priority, application Netherlands, Apr. 20, 1965, 6504939
8 Claims. (Cl. 261—98)

ABSTRACT OF THE DISCLOSURE

A fluid distributor for a liquid-vapor contact column adapted to receive a fluid stream, divide the fluid stream and deliver drops of the fluid uniformly over an area comprising: means defining a fluid inlet having an outflow opening; a baffle mounted below said outflow opening in the path of liquid issuing from said outflow opening; and a plurality of deflector strips circumferentially surrounding said baffle and radially spaced therefrom, individuals of said deflector strips depending at differing angles with respect to the horizontal whereby adjacent individuals of said strips have lower ends at different radial distances from the longitudinal centerline of said baffle, said deflector strips having portions extending above the level of the baffle and being arranged to capture fluid splashed from said baffle and drip at least a portion of the capture fluid from the deflector strip lower ends.

---

The present invention relates to fluid distribution and more particularly to apparatus for distributing incoming fluid about the cross-sectional area of a liquid-vapor contact column or the like.

In absorption columns or rectification columns, water, a liquid reaction mixture or some other liquid for instance a solvent is sprayed onto a bed of packing, such as Raschig rings and trickles down through the packing in direct contact with an up-flowing gas.

It is desirable that the incoming liquid be distributed over the area of the column as uniformly as possible in order to maximize liquid-gas contact in the column. However, liquid atomizers are unsuitable for the purpose, as the dimensions of the drops formed by this type of device are so small that a large portion of the liquid is entrained by the rising gas stream. Moreover, the packing material in the column can be damaged owing to the high speed at which the liquid spray from such atomizing devices hits the bed. If the liquid to be sprayed contains components that become gaseous as a result of the expansion occurring prior to or during the spraying, for instance ammonia or carbon dioxide, means must be provided to ensure that these gases can escape in such way as not to disturb the spraying action.

In one prior art distributing device of the general type to which the present invention is addressed, a baffle plate and hood are provided at the top of the column and constitute an annular spraying channel for incoming liquid. Thus, a conical sheet of liquid is formed. Therefore, the distribution of the liquid over the area to be sprayed is not uniform and the liquid hits the bed at too high a speed, causing fine drops of liquid to form which are entrained by the rising gas stream and swept back out of the column.

It is a primary object of the present invention to provide a device by which the liquid input to a column of the type described is uniformly distributed over the area to be sprayed and falls onto this area in rather large drops and at a moderate speed, while the gases contained in the spraying liquid have the opportunity to separate from the liquid without interfering with the spraying action.

A further object of the invention is the provision of a liquid distributing device for apparatus of the type described which includes an inlet conduit, a baffle plate spaced below the terminus of the inlet conduit in the path of liquid emerging from the conduit and a plurality of deflector strips circumferentially surrounding and radially spaced from the baffle plate, the deflector strips depending at differing angles with respect to the horizontal whereby liquid can drip onto the packing from the lower ends of the deflector strips at differing radial distances from the longitudinal center line of the column, to thereby accomplish uniform distribution of the incoming liquid.

Another object of the invention is the multiplication of the drip sites provided on the deflector strip lower ends by providing serrations, knurling, teeth or the like on the deflector strip lower ends.

Yet another object of the invention is the provision, in apparatus of the type described, of a plurality of angularly and radially spaced openings through the baffle plate in order to provide liquid distribution to the column area near the longitudinal axis of the column.

It is an object of the invention to circumferentially surround the deflector strip array by a hood in order to provide for gas collection and it is a further object of the present invention to support the lower ends of the deflector strips to prevent such vibration of the deflector strips as would result in their early failure due to stress cracking and the like.

These and other objects of the present invention as well as the inventions, principles and scope of applicability should become more clearly apparent during the course of the following detailed discussion of various aspects of the exemplary embodiment of the invention shown in the annexed drawing.

Figure 1:
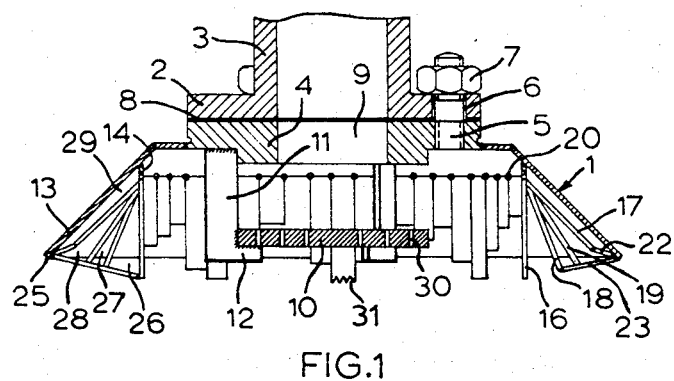
FIGURE 1 is a cross-sectional view of a spraying device according to the invention taken substantially along the line 1—1 in FIGURE 2.
Figure 2:
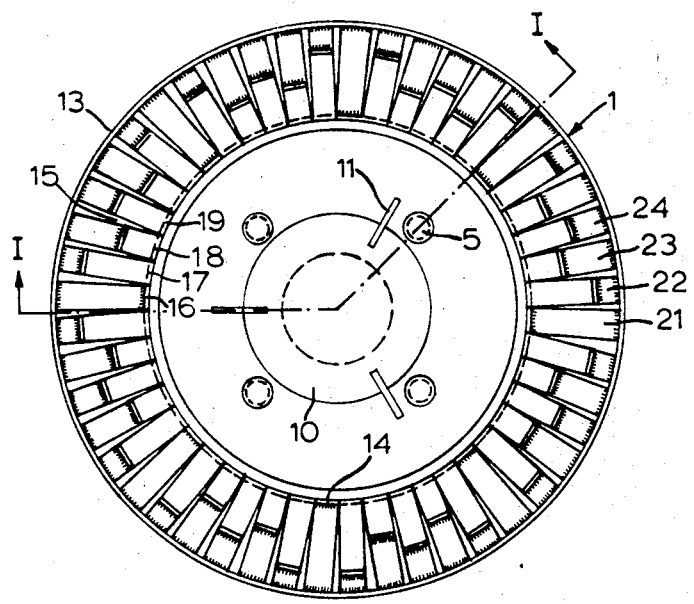
FIGURE 2 is a bottom view of this spraying device.

A spraying device 1 is connected to the flange 2 of a feed conduit for liquid 3. The bottom plate 4 of the spraying device is to this end provided with stud bolts 5, passing through holes 6 in the flange 2, and clamped against this flange by means of nuts 7 screwed onto the stud bolts. To prevent leakage, flange packing 8 is placed between the flange and the bottom plate.

The bottom plate is provided with a central opening 9 which registers with the outflow opening of conduit 3. At some distance below and in the direct fluid path from the central opening 9 there is a circular baffle plate 10, which is kept in place by brackets 11 welded to the bottom plate 4 on the one side and to the baffle plate on the other side. The brackets 11 have hook-shaped projections 12, which support the baffle plate 10 and absorb the force exerted on the baffle plate by the liquid issuing from the conduit.

Concentric with the opening 9 and the baffle plate 10 is a frusto-conical hood or jacket 13, connected to the bottom plate 4 by welds so as to flare downwardly and outwardly from the bottom plate 4. Welded to the inside of the hood 13 is a generally annular sleeve 14, the lower part of which is provided with a plurality of longitudinal incisions 15, which terminate short of the upper extent of the sleeve 14 so that arcuately spaced strips 16, 17, 18 and 19 are formed. The upper ends of these incisions are terminated by bores 20, whose diameter is slightly larger than the width of the incisions. This reduces the chance of the formation of capillary cracks and the occurrence of fatigue ruptures. The strips 16 are disposed vertically, the strips 17, 18 and 19 are bent outwards at different angles. The strips 16, 17, 18 and 19 are formed alternately about the sleeve 14. For strength and to prevent excessive vibration or bending of the strips as a result of forces exerted on the strips by the liquid, the lower, otherwise free ends of the strips are connected to the bottom edge 25 of the hood by strips 21, 22, 23 and 24.

The device here described can be installed in the top section of an absorption or rectification column. The liquid issuing from conduit 3 hits the plate 10 and is splashed sidewards. The liquid then hits the strips and drips down, raining down on the bed in the column in large drops.

The liquid, which issues at high speed from the outflow opening of the conduit and is sprayed onto the baffle plate, splashes sideways from this plate and hits the strips. A large portion of the liquid adheres to these strips and runs down them, forming large drops which, owing to the differing angles formed by the strips, falls onto the area to be sprayed at different distances from the longitudinal center line of the distributing device.

Formation of serrations, teeth and/or knurling on the bottom edges of the strips, as shown at 31 in FIG. 1, is within the contemplation of the invention in order to promote a uniform formation of drops and multiply the sites for drop formation. The liquid drips uniformly in concentric rings onto the bed in the column.

Part of the liquid flung against the strips splashes back, so that part of the area to be sprayed which is screened off from the liquid feed by the baffle plate becomes wetted. In addition, the baffle plate 10 as shown can be provided with a number of small bores 30 in FIGURE 1 so that some liquid drips directly from this plate onto the bed under the plate. Instead of a flat baffle plate 10 as shown a curved or conical plate can be used.

The gases for instance ammonia and carbon dioxide contained in the liquid can escape, through openings 26, 27 and 28 between the strips, to the space 29 under the hood, from where they can be carried off under the bottom edge 25 of the hood without interfering with the spraying action.

The pressure loss occurring in the distributing device according to the invention is small, and the ample passage prevents blockage of the distributor by solid particles present in the incoming liquid.

It should now be apparent that the present invention accomplishes each of the objects set forth hereinabove and that the embodiment shown and discussed clearly illustrates the principles of the invention. Because the illustrated embodiment is susceptible of considerable modification without departing from these principles or failing to accomplish the objects of the invention, the present invention should be understood as encompassing all such modifications as are within the spirit and scope of the following claims.

What is claimed is:

1. A fluid distributor for a liquid-vapor contact column adapted to receive a fluid stream, divide the fluid stream and deliver drops of the fluid uniformly over an area comprising: means defining a fluid inlet having an outflow opening; a baffle mounted below said outflow opening in the path of liquid issuing from said outflow opening; and a plurality of deflector strips circumferentially surrounding said baffle and radially spaced therefrom, individuals of said deflector strips depending at differing angles with respect to the horizontal whereby adjacent individuals of said strips have lower ends at different radial distances from the longitudinal centerline of said baffle, said deflector strips having portions extending above the level of the baffle and being arranged to capture fluid splashed from said baffle and drip at least a portion of the capture fluid from the deflector strip lower ends.

2. The distributor of claim 1 wherein said deflector strips are integral with an annular sleeve positioned with the longitudinal axis thereof generally vertical; said deflector strips being defined between longitudinal slits in said annular sleeve from the lower end thereof proceeding incompletely toward the upper end of said annular sleeve; at least some of said deflector strips being canted obliquely outwards.

3. The distributor of claim 2 wherein each slit terminates at its upper extent in means defining a bore having a diameter larger than the width of the respective slit.

4. The distributor of claim 1 further including means defining a plurality of drip forming sites on the lower ends of at least some of said deflector strips.

5. The distributor of claim 1 further including means defining a plurality of small openings through said baffle plate whereby some of the fluid impinging on the baffle plate is enabled to drip from the baffle plate through the small openings.

6. The distributor of claim 1 further including means defining a hood circumferentially surrounding the deflector strips, said fluid inlet means projecting downwardly through the hood and said hood being secured to the fluid inlet means.

7. The distributor of claim 6 wherein said hood includes a frusto-conical sidewall circumferentially surrounding the deflector strips; the strips adjacent the upper ends thereof being secured to said sidewall.

8. The distributor of claim 7 wherein the deflector strips are integral with an annular sleeve positioned with the longitudinal axis thereof generally vertical; at least some of said deflector strips being canted obliquely outwards; and means securing the lower ends of said deflector strips to said hood, the last mentioned securing means being constructed and arranged to reduce the susceptibility of the deflector strips to vibration and bending as the deflector strips are splashed by fluid from said baffle.

References Cited

UNITED STATES PATENTS

| | | | |
|---|---|---|---|
| 2,143,877 | 1/1939 | Harte | 261—110 |
| 2,639,130 | 5/1953 | Heere | 261—97 |
| 2,915,302 | 12/1959 | Jacir | 261—110 XR |
| 2,990,031 | 6/1961 | Michael | 261 |
| 3,006,623 | 10/1961 | Ross et el. | 261—110 |
| 3,263,976 | 8/1966 | Hilinski | 261—98 |
| 3,273,872 | 9/1966 | Eckert | 261—101 XR |

HARRY B. THORNTON, *Primary Examiner.*

E. H. RENNER, *Assistant Examiner.*